United States Patent
Ramamurthy et al.

(10) Patent No.: US 6,365,695 B1
(45) Date of Patent: *Apr. 2, 2002

(54) ULTRASONIC CATALYST FEED FOR FLUID BED OLEFIN POLYMERIZATION

(75) Inventors: Arakalgud Venkatapathia Ramamurthy, Bound Brook, NJ (US); Clark Curtis Williams, Charleston, WV (US)

(73) Assignee: Union Carbide Chemicals & Plastics Technology Corporation, Danbury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/547,265

(22) Filed: Apr. 11, 2000

Related U.S. Application Data

(62) Division of application No. 09/325,823, filed on Jun. 4, 1999, now Pat. No. 6,150,478.

(51) Int. Cl.⁷ .............................................. C08F 110/02
(52) U.S. Cl. ........................ 526/352; 526/901; 526/919
(58) Field of Search ................................. 526/901, 352, 526/919; 428/402

(56) References Cited

U.S. PATENT DOCUMENTS

| | | | |
|---|---|---|---|
| 4,655,393 A | 4/1987 | Berger | 239/102.1 |
| 4,730,071 A | 3/1988 | Schoenthal et al. | 556/179 |
| 5,215,949 A | 6/1993 | Koskinen et al. | 502/5 |
| 5,317,036 A | 5/1994 | Brady, III et al. | 523/223 |
| 5,332,706 A | 7/1994 | Nowlin et al. | 502/107 |
| 5,386,690 A | 2/1995 | Shustorovich et al. | 60/274 |
| 5,541,270 A | 7/1996 | Chinh et al. | 526/68 |
| 5,559,199 A | 9/1996 | Abe et al. | 526/160 |
| 5,668,228 A | 9/1997 | Chinh et al. | 526/67 |
| 5,693,727 A | 12/1997 | Goode et al. | 526/86 |
| 5,733,510 A | 3/1998 | Chinh et al. | 422/143 |
| 5,744,556 A | 4/1998 | Keller et al. | 526/135 |
| 5,780,562 A | 7/1998 | Shimizu et al. | 526/129 |
| 5,830,821 A | 11/1998 | Rohrmann et al. | 502/117 |

FOREIGN PATENT DOCUMENTS

| | | |
|---|---|---|
| EP | 0 593 083 A1 | 10/1993 |
| EP | 0 811 637 A2 | 12/1997 |
| WO | WO 9414856 A1 | 7/1994 |
| WO | WO 97/18888 | 5/1997 |
| WO | WO 98/37103 | 8/1998 |

Primary Examiner—Fred Teskin

(57) ABSTRACT

Liquid catalyst composition is fed to a fluidized bed olefin polymerization reactor through an ultrasonic nozzle, enabling improved control over average catalyst composition droplet size and size distribution, which provides better control over resin particle size. The spray may be surrounded by a shroud of gas which creates a particle lean zone, thus reducing the likelihood of contact by the catalyst composition with existing product particles already suspended in the fluid bed.

7 Claims, 2 Drawing Sheets

ULTRASONIC CATALYST FEED FOR FLUID BED OLEFIN POLYMERIZATION

This application is a divisional application of U.S. Ser. No. 09/325,823 filed Jun. 4, 1999 now U.S. Pat. No. 6,150,478 issued Nov. 21, 2000.

FIELD OF THE INVENTION

This invention relates to the manufacture of polyolefins in fluidized beds, and particularly to processes for feeding liquid catalyst into fluidized bed polyolefin reactors.

BACKGROUND OF THE INVENTION

Liquid catalysts offer many advantages over traditional solid-supported catalysts for the gas phase polymerization of olefins. Feeding of liquid catalysts into reactors has, however, often led to reactor and/or nozzle fouling. Traditional nozzles for spraying liquids,, such as gas assisted nozzles and conventional two-fluid nozzles, require critical coordination of the flow rates of the gas and liquid for satisfactory performance. Flow rates of both the components and the mixture are functions of the nozzle design, particularly the orifice diameter and gas mixing site. Generally, traditional nozzles deliver dense, high velocity sprays immediately downstream of the nozzle exit. The density and velocity of the spray causes it to tend to deposit on the resin in the fluidized bed, leading to accelerated polymerization on the surface of the resin particles already formed. Continued coating with catalyst and the subsequent surface reaction can lead to the formation of resin particles too large to be fluidized in the bed, in turn leading to shut-down of the reactor, a very expensive event. Growth of resin particles from agglomeration effects can also occur due to concentrated catalyst activity. A high initial reaction rate increases the temperature of the young polymer particles, causing them to approach temperatures near, or in excess of, the resin softening temperature. The soft, or molten, resin can adhere to other particles in the bed, resulting in agglomeration and uncontrolled particle growth.

Poor control over catalyst distribution can also lead to unacceptably high concentrations of fine resin particles, which tend to increase the undesirable effects of static electricity, always a potential problem in the reactor. As is known, static charges lead to unwanted accumulations of resin and sheeting. Fine particles also can lead to fouling of the recycle piping, compressor, and heat exchanger.

The use of liquid catalysts in fluidized bed olefin polymerization is discussed in Brady et al U.S. Pat. No. 5,317,036 and in Goode and Williams U.S. Pat. No. 5,693.727, both of which are incorporated herein by reference. See also Keller et al U.S. Pat. No. 5,744,556.

Ultrasonic liquid atomizers are known. See, for example, Berger's U.S. Pat. No. 4,655,393 and Tsai's U.S. Pat. No. 5,687,905, which uses concentric gas introduction to assist in atomization.

Ultrasonic energy has been used to make olefin polymerization catalyst components—see U.S. Pat. No. 4,730,071, col. 1 lines 52–53 and examples 1, 4, and 5; col. 4, lines 19–20; U.S. Pat. No. 5,455,366 col. 20, line 20, U.S. Pat. No. 3,979,370, col. 3 line 13; U.S. Pat. No. 5,559,199, col. 38 line 42; U.S. Pat. No. 5,830,821, col. 18 line 62, and U.S. Pat. No. 5,780,562, col. 16, line 48. However, these processes generally involve the use of ultrasonic baths or dispersions or occasionally breaking up solids. Ultrasonic nozzles are suggested for making polymerization catalysts in U.S. Pat. No. 5,215,949.

Liquid catalysts have been fed to a combustion reaction zone—see U.S. Pat. No. 5,386,690, col. 5 lines 1–8; in four related U.S. Pat. No. 5,804,677 (col. 13, line 42), U.S. Pat. No. 5,733,510 (col. 13, line 44), U.S. Pat. No. 5,668,228 (col. 13, line 44) and U.S. Pat. No. 5,541,270 (col. 13, line 40) a liquid recycle in olefin polymerization is assisted with ultrasonic nozzles.

Methylaluminoxane was fed together with ethylene through an ultrasonic nozzle into a polymerization reactor, which resulted in "no activity from the zirconium sites"— page 26, WO94/14856.

Many conventional nozzles provide unbroken ligaments of liquid from the nozzle rather than discrete droplets if all conditions are not right—for example, a minimum flow rate. Where high activity solution catalysts are to be fed, it has been observed that substantial amounts of diluent, such as isopentane, must be used to maintain liquid flow rates above the critical value in order to assure droplet formation.

SUMMARY OF THE INVENTION

Our invention provides for the use of an ultrasonic nozzle to feed liquid catalyst to a fluidized bed olefin reactor. A prime example of the type of reactor, and the catalysts fed to it, to which our invention is applicable, is given in the aforementioned Brady et al U.S. Pat. No. 5,317,036, which is incorporated herein by reference. Our invention is useful for any and all known olefin polymerization catalysts to be fed in liquid form. These are generally known in the art but include those identified and referenced by Goode and Williams in U.S. Pat. No. 5,693,727, which is incorporated entirely herein by reference. Our invention may also be used in other known types of commercial fluid bed polyolefin manufacturing systems. Common olefins polymerized by our process include ethylene, propylene, and butadiene, but any other polymerizable olefins and mixtures of olefins are included within the scope of our invention.

The use of ultrasound (or ultrasonic vibrations) to create liquid droplets is a powerful means of introducing liquid catalysts into a gas phase polymerization reactor, such as a UNIPOL reactor for polymerization of ethylene and other olefins as discussed in the Brady '036 patent. The ultrasonic nozzle can be located in a "particle-free" zone, such as the disengagement section or the zone below the fluidized bed (in the absence of a distributor plate) or within a "particle lean" zone. A particle-lean zone may be created by surrounding the catalyst composition droplets with a deflecting gas introduced preferably concentrically with the liquid catalyst composition.

We use the term "liquid catalyst composition" herein to mean olefin catalyst, cocatalyst or activator in liquid form, i.e. either neat, dissolved, emulsified or mixed, and substantially free of gas. The cocatalyst or activator, if used in the liquid catalyst composition, is typically methylaluminoxane (MAO) but may be any of the other cocatalysts described by Goode and Williams in the '727 patent. In particular, the catalyst can be composed of one or more metal compounds in combination with one or more co-catalysts. Alternatively, all or a portion of the cocatalyst can be fed separately from the metal compound(s) to the reactor. Promoters associated with any particular polymerization are usually added to the reactor separately from the cocatalyst and/or compound(s). Our invention may feed any liquid catalyst composition, including Ziegler-Natta catalysts, chromium based catalysts, vanadium based catalysts, metallocene catalysts, cationic forms of metal halides, cobalt catalysts and mixtures thereof, nickel catalysts and mixtures and rare earth metal catalysts all as known in the art and/or as described in more detail in the herein incorporated Goode and Williams U.S. Pat. No. 5,693,727.

If the metal compound and/or the cocatalyst occurs naturally in liquid form, it can be introduced "neat" through the ultrasonic nozzle and into a particle lean or particle free zone. More likely, the liquid catalyst is introduced into the particle lean zone as a solution (single phase, or "true" solution using a solvent to dissolve the metal compound and/or cocatalyst), an emulsion (partially dissolving the catalyst components in a solvent), suspension, dispersion, or slurry (each having at least two phases). Preferably, the liquid catalyst employed is a solution or an emulsion, most preferably a solution. As used herein, "liquid catalyst" or "liquid form" includes neat, solution, emulsion, and dispersions of the transition metal or rare earth metal component (s) of the catalyst and/or cocatalyst.

The solvents that can be utilized to form solutions of the soluble, unsupported transition metal and/or rare earth metal polymerization catalyst compounds are inert solvents, preferably nonfunctional hydrocarbon solvents, and may include nongaseous solvents having from 2 to 8 carbon atoms.

The concentration of the catalyst and/or cocatalyst in the solvent (or carrier phase in the case of a dispersion or emulsion) may range from 0.001% to 100% by weight. Preferably, where solvent or carrier is used, catalyst may be present in concentrations of 0.001% to 50%, more preferably 0.01% to 10%, and most preferably 0.05 to 0.5% by weight. In the case of cocatalyst, a range of 0.001 to 50% is preferable; more preferably 0.01 to 10%, and most preferably 0.1 to 2%.

In a preferred embodiment of the present invention, the liquid catalyst composition, liquid catalyst, catalyst solution, mixed catalyst solution, emulsified, dispersed, or diluted catalyst is surrounded by at least one gas which serves to move or deflect resin particles of the bed out of the path of the liquid catalyst composition as it enters the fluidization zone and away from the area of catalyst entry, thereby providing a particle lean zone. The shroud of surrounding gas is generated by flowing the gas in a tube concentric to the ultrasonic nozzle. The gas may be nitrogen or any other gas inert in the fluidized bed environment, or it may include reactive monomer or recycle gas.

A resin particle lean zone is established in the reactor by feeding the liquid catalyst composition such that the droplets formed by the ultrasonic nozzle do not immediately contact a substantial portion of the resin particles already formed and suspended in the fluidized bed. In order to reduce the likelihood that the droplets of liquid catalyst composition do not immediately contact existing suspended resin particles, the ultrasonic nozzle may be surrounded by a concentric tube for delivering a surrounding gas which serves to move or deflect resin particles out of the path of the liquid catalyst composition as it enters the fluidization zone, thus forming a particle lean zone. Such a gas, or more than one gas, forms a shroud around the droplets generated by the ultrasonic nozzle, thus preserving the desired average diameter and span of diameters, discussed elsewhere herein, and enhancing the likelihood that the newly introduced catalyst will be activated and build particles independently of existing particles, in turn providing better control over the size and size distribution of the resin particles. The shroud, together with the cloud of droplets it surrounds, forms a particle-lean zone which is maintained as long as the droplets are sprayed within the concentric gas. Both the gas and the droplets are continuously dispersed into the fluidized bed by the currents and convection of the bed.

While we do not use gas in our liquid catalyst composition for feeding through the ultrasonic nozzles, we may use a variety of gases in the concentric tube which forms the above-described particle-lean zone and/or forms the above-described shroud. The concentrically injected gas may include not only inert (in the reactor environment) gases such as low molecular weight saturated hydrocarbons, nitrogen, and argon, but may also include recycle gas (gas which is taken from the recycle line for temperature maintenance or other reasons), chain transfer gas (generally hydrogen) and monomer intended for inclusion in the resin product, such as ethylene, propylene, and/or hexene.

This method offers many advantages over other conventional droplet formation methods. Specific advantages include: instantaneous droplet formation with little or no ligament formation at the nozzle exit even at very low liquid flow rates; does not need any gas for droplet formation; precise control of the droplet size and its distribution through the choice of vibration frequency (that is, little or no satellite droplet formation); very low velocity (or, soft) spray in contrast to high velocity plumes from other methods, precise control of the spray angle, if necessary, additional droplet size variation through harmonic effects with two-fluid ultrasonic nozzle, intimate, molecular mixing of components of the catalyst, and possible enhanced catalytic activity due to sonochemical effects.

FIG. 2 depicts comparative results for a single orifice 0.04 inch injection tube.

DETAILED DESCRIPTION OF THE INVENTION

Our invention provides excellent control of catalyst droplet size and catalyst droplet size distribution in the fluidized bed environment of an olefin polymerization reactor, through the use of ultrasonic nozzles.

The spectrum of sonic vibrations ranges from low frequencies through human audibility up to 20 kHz to very high frequencies of up to 100 MHz, used, for example, for "sonograms" in medical diagnosis. The range of frequencies between 20 kHz and 100 kHz, sometimes called "power ultrasound", is commonly used for liquid atomization. When a liquid film on a smooth solid surface is set into a vibrating motion in a direction perpendicular to the surface, the liquid absorbs some of the vibrational energy that manifests as standing waves, known as "capillary waves." At a given energy input, when the frequency of vibration increases beyond a critical frequency characteristic of the liquid, the capillary wave becomes unstable and tiny drops of liquid are ejected from the tops of the degenerating waves normal to the atomizing surface. The critical wavelength, $\lambda_c$, can be expressed as $$\lambda_c=2\pi(\sigma/\rho_0\omega^2)^{1/3}$$

Where $\sigma$ is the surface tension of the liquid, $\rho_0$ is the density of the liquid and $\omega$ is the frequency of the vibrations. For water ($\sigma$=0.073 Newton/meter), for example, the diameter of the droplet in microns can be written as $$D=(2*10^{-4})f^{-2/3}$$

Where f is frequency in kHz. That is, the droplet diameter decreases exponentially with increasing frequency.

Although the above expression is for water at ambient temperature, droplet diameters for other liquids may be readily determined if the surface tension for the liquid is known. A variety of satisfactory ultrasonic nozzles for liquid atomization are commercially available from Sonotek Corporation of Poughkeepsie N.Y., and from Sonics and Materials of Newtown, Conn. The ultrasonic nozzles may be of the type which operate only at one frequency or which may be tuned through a range of frequencies.

Figure 1:
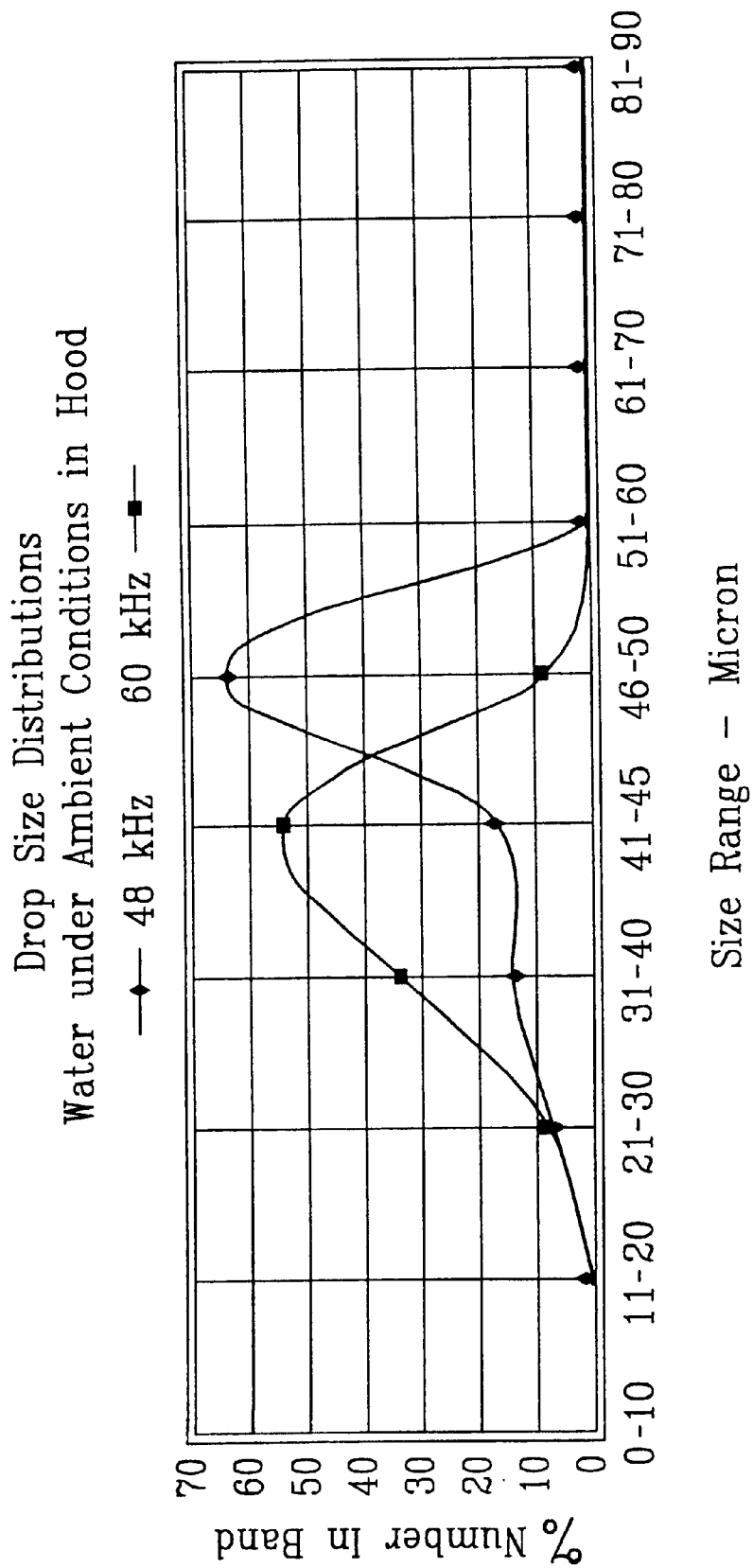
FIG. 1 is a plot of the distribution of water droplet sizes made by an ultrasonic nozzle at 48 and 60 kHz.
Figure 2:
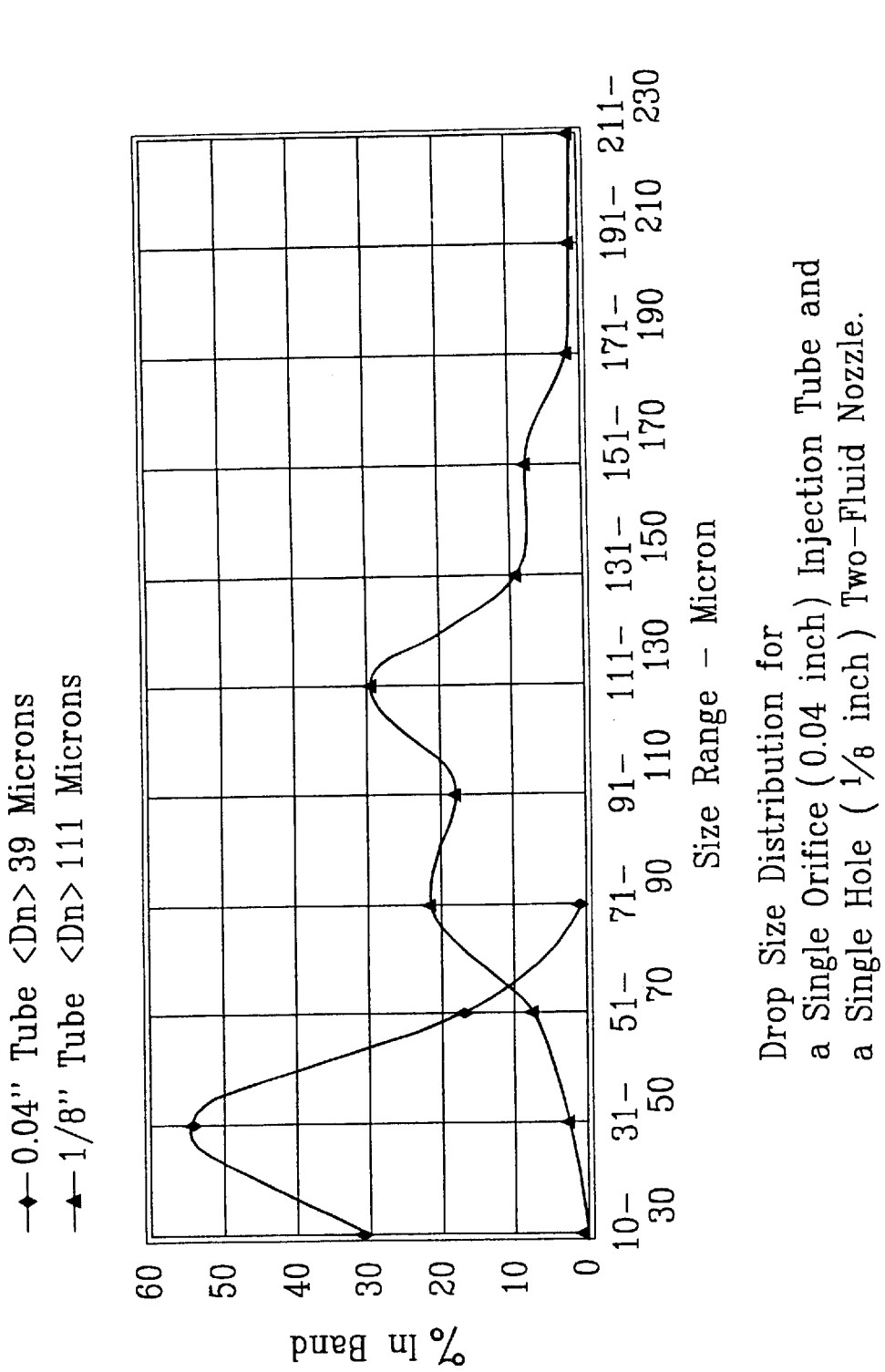

FIG. 1 gives the drop size distribution for water obtained with two ultrasonic nozzles with 48 kHz and 60 kHz input frequencies. A significant feature is the narrow drop size distribution obtained with the ultrasonic nozzles. For example, with the 48 kHz nozzle (diamond-shaped data points) in excess of 90% of all droplets are within a drop size range 40 to 60 $\mu$m; with the 60 kHz nozzle (square data points), all the droplets are within 30–50 $\mu$m range. The breadth of the distribution can be specified with what is usually termed, "span" of the distribution. The lower the span, the narrower is the distribution. Span is defined as the ratio $$\frac{D_{90}-D_{10}}{D_{50}}$$

Where $D_{90}$, $D_{10}$, and $D_{50}$ are the $90^{th}$, $10^{th}$, and $50^{th}$ percentile of the distribution. Note $D_{50}$ is simply the average drop diameter. The values of span of distribution in Table 1 for the two nozzles, where the factors $D_{90}$, $D_{10}$, and $D_{50}$ are obtained by image processing software using direct photographic data, are 0.27 (48 kHz) and 0.63 (60 kHz). For comparative purposes, FIG. 2 gives the drop size distribution for a single orifice 0.04 inch injection tube, a 3-hole perpendicular nozzle, and a conventional ⅛ inch single-orifice two-fluid nozzle. It is clear that the distribution of droplet size obtained from these nozzles is substantially broader than that with the ultrasonic nozzle. Table I below gives a comparison of the span for these nozzles at comparable flow, pressure and sonic energy input. The ultrasonic nozzles used were purchased from Sonotek Corporation.

TABLE 1

Span of Distribution for the Nozzles Examined

| Nozzle | Span |
|---|---|
| 48 kHz Ultrasonic | 0.27 |
| 60 kHz Ultrasonic | 0.63 |
| 0.04 inch I.D. injection tube | 1.5 |
| 3-hole perpendicular | 1.7 |
| ⅛ inch Single Orifice two-fluid | 1.62 |

The density of methylaluminoxane (MAO) cocatalyst is about 0.8 and a solution diluted with isopentane may be about 0.6, depending on the extent of dilution; a change from 0.8 to 0.6 would change the droplet diameter about 10%. The catalyst and cocatalyst may be combined in liquid form as described by Goode and Williams in the aforementioned '727 patent and elsewhere herein.

Nozzles other than ultrasonic usually require use of a gas to form fine droplets, and their performance is extremely sensitive to gas and liquid flow rates. The ultrasonic nozzles do not require use of any gas to make fine droplets. Ultrasonic nozzles can be configured to work with two or more liquid components. For example, the solution catalyst and the catalyst activator can be combined upstream before entering the nozzle. This facilitates intimate mixing of the components and enhances catalyst activity. Second, the spray issuing from an ultrasonic nozzle is a very low velocity spray. Droplet velocity is only of the order of a few centimeters per second, in contrast to velocities at least two to three orders of magnitude higher from two-fluid nozzles. That is, a spray plume need not be generated with ultrasonic nozzles. In contrast to other catalyst introduction devices, ultrasonic nozzles have low flow rate capabilities, thus substantially reducing need for diluents such as isopentane. Also, because of the low spray velocity, a low velocity gas shroud around the nozzle can control the spray shape and improve the formation of the primary particles during polymerization. A gas shroud assists in the drying of the droplets where that is desired.

With any of the above described liquid catalysts, mixtures of liquid catalysts and/or catalyst activation, diluents, and/or carriers, we prefer to generate droplets having a diameter distribution span of less than 3 (0.1 to 3 will suffice in many cases), preferably 0.1 to 1.5, and most preferably less than 1. These ranges of span may be variously used for average particle diameters of 1–100 microns, preferably 2–30 microns, and most preferably 10–25 microns.

Finally, ultrasonic nozzles are not prone to fouling. The droplet formation is instantaneous (nozzle is energized before the liquid enters the nozzle) and an inert gas shroud around the nozzle inhibits any possible reaction in the vicinity of the nozzle, thus reducing the risk of clogging.

While our process will perform satisfactorily at frequencies between 10 to 100 kHz, we prefer to operate our ultrasonic nozzles with a frequency of 40–75 kHz, most preferably 45–68 mHz. Best results are obtained when the flow rates, catalyst concentration and ultrasonic frequencies are all maintained substantially constant over the production period, within variations of no more than plus or minus ten percent of the nominal.

What is claimed is:

1. A dispersion of liquid droplets, wherein the droplets are formed from the liquid without the use of a second fluid, said droplets comprising olefin polymerization catalyst in an atmosphere comprising polymerizable monomer, said droplets having an average diameter from 1 to 100 microns and a distribution span less than 1.

2. A dispersion of claim 1 wherein said droplets have an average diameter of 2 to 30 microns.

3. A dispersion of claim 1 wherein said droplets have an average diameter of 10 to 25 microns.

4. A dispersion of claim 1 wherein said polymerizable monomer comprises ethylene.

5. A dispersion of claim 2 wherein said polymerizable monomer comprises ethylene.

6. A dispersion of claim 3 wherein said polymerizable monomer comprises ethylene.

7. A dispersion of claim 1 wherein said catalyst is a metallocene catalyst.

* * * * *